US008620639B2

(12) United States Patent
Candia et al.

(10) Patent No.: US 8,620,639 B2
(45) Date of Patent: Dec. 31, 2013

(54) SIMULATION OR TEST SYSTEM, AND ASSOCIATED METHOD

(75) Inventors: Fabrice Candia, Rieux (FR); Alain Houtekier, Lespinasse (FR); Jean-Marie Calluaud, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 38 days.

(21) Appl. No.: 12/821,482

(22) Filed: Jun. 23, 2010

(65) Prior Publication Data

US 2011/0010156 A1    Jan. 13, 2011

(30) Foreign Application Priority Data

Jun. 23, 2009  (FR) ..................................... 09 54286

(51) Int. Cl.
*G06F 9/44*     (2006.01)
*G06F 13/10*    (2006.01)
*G06F 13/12*    (2006.01)

(52) U.S. Cl.
USPC ............................................................ 703/21

(58) Field of Classification Search
USPC ............................................................ 703/21
See application file for complete search history.

(56) References Cited

U.S. PATENT DOCUMENTS

| 6,735,523 B1 | 5/2004 | Lin et al. |
| 7,406,050 B2* | 7/2008 | Calluaud et al. ............... 370/250 |
| 2002/0091969 A1* | 7/2002 | Chen et al. ...................... 714/43 |
| 2004/0183787 A1 | 9/2004 | Geaghan et al. |
| 2004/0227523 A1 | 11/2004 | Namaky |

OTHER PUBLICATIONS

Chandy et al. "Asynchronous Distributed Simulation via a Sequence of Parallel Computations." Apr. 1981 ACM.*
Charara et al. "Modelling and Simulation of an Avionics Full Duplex Switched Ethernet" 2005 IEEE.*

* cited by examiner

*Primary Examiner* — Saif Alhija
(74) *Attorney, Agent, or Firm* — Oblon, Spivak, McClelland, Maier & Neustadt, L.L.P.

(57) ABSTRACT

A simulation or test system for a network architecture of computers and active equipment items, in particular on board an aircraft, and a corresponding method are disclosed. The system comprises a simulation unit comprising models simulating at least one part of the computers. Moreover, each computer or simulation model is able to communicate on a real network through a corresponding active equipment item to which the computer, simulated if need be, is directly connected in the network, and the simulation unit may acquire a message sent out by a computer or a simulation model on the network, and transmit the acquired message to simulation models that are recipients thereof. The simulation unit acquires the message at the corresponding active equipment item to which the sending computer or simulation model is directly connected.

19 Claims, 3 Drawing Sheets

SIMULATION OR TEST SYSTEM, AND ASSOCIATED METHOD

BACKGROUND OF THE INVENTION

1. Field of the Invention

This invention relates to a simulation or test system for a computer network architecture, in particular on board an aircraft, and a corresponding simulation method.

2. Discussion of the Background

Nowadays the development of real systems is accomplished progressively with the aid of simulation systems. These systems make it possible to visualize and test projects in progress but also to have the latter evolve rapidly and at lower costs.

This is the case in particular in the aeronautical domain where simulation systems are used in which on-board equipment items, also called real computers, are integrated with modules simulating other equipment items.

In recent aircraft models, real computers are integrated into a digital network architecture of Ethernet type adapted for aeronautics and called ADCN ("Avionics Data Communication Network") network using AFDX ("Avionics Full DupleX switched Ethernet") technology. This network is made up of switches through which the computers communicate.

In this network, communications among computers are carried out in unconnected multicast (multicast) mode, that is to say without the recipient(s)' of the data acknowledging receipt to the sender. The paths that the various data take are organized in the form of virtual links ("Virtual Link" or "VL"). A virtual link is a logic path between a transmitting computer and n receiving computers.

These virtual links make it possible to define as many logic paths as necessary, mutually impermeable, and having guaranteed performances despite recourse to a common physical network. The combination of these links constitutes the logic topology of the network. In order to guarantee the required performances and meet the constraints for aeronautical certification, this logic topology is defined statically.

On the physical network, the data exchanged among the computers may pass in transit via one or more switches according to the physical topology of the ADCN network.

Document FR 2 868 567 presents a simulation system provided for such an avionic architecture. In this system, a simulation unit comprises models simulating real computers (a kind of software composed of functions of the simulated equipment items), and functions for AFDX communication with the real ADCN network to which it is connected. The simulation models are integrated into the ADCN digital network via the communication functions. By virtue of this integration, the simulation models communicate among themselves or with on-board equipment items, under conditions as close as possible to those found in the real aircraft.

SUMMARY OF THE INVENTION

This system has several disadvantages. On the one hand, communications from a real computer to several simulated models require several acquisitions of the same message by the simulation unit. This multi-acquisition may generate a substantial processing load for the simulation unit, as compared to the number of communications carried out in the network.

On the other hand, in such a standard simulation system, the simulation models exchange data among themselves via the memory of the simulation unit. The disadvantage of such an architecture is that these exchanges do not take into account the availability of the ADCN network. In addition, since the exchanges do not take place via the ADCN network, the operating conditions of the latter are not faithfully reproduced, which may impair the quality of the simulation carried out.

For this reason, the inventors provided that the simulation unit transmits, on the ADCN network, the data sent out by each simulation model.

Nevertheless, this modification of the simulation system has some disadvantages which led, at the present time, to over-designing the simulation units.

It is noted first of all that the activity of the simulation unit is greatly increased on the one hand by the need to transmit on the ADCN network the data sent out by each simulated model, and on the other hand by the need to acquire these data on the ADCN network even if it had them available beforehand. It also is noted that, because of the multicast mode of communication (a message is sent out to n recipients, in which superfluous redundancies generally are present), the simulation unit more often than not is led to acquire several times on the network the message that it has just sent out.

This results in a needless overload of this simulation unit and an over-designing in order to satisfy real-time constraints. In certain configurations, the simulation unit may be led to process some 5 gigabytes per second (5 Gb/s).

This invention then is intended to resolve one of the disadvantages of the prior art, and in particular that of reducing the processing load of the simulation unit.

With this in mind, the invention applies in particular to a simulation or test system for a network architecture of computers and active equipment items, comprising:

a simulation unit comprising models simulating at least one part of the said computers, each computer or simulation model being able to communicate on a real network through an active equipment item, known as corresponding active equipment item, to which the said computer, simulated if need be, is directly connected in the network topology, the simulation unit being equipped to acquire a message sent out by a computer or a simulation model on the network, and to transmit the message so acquired to simulation models that are recipients thereof, in which the simulation unit is equipped to acquire the said message at the corresponding active equipment item to which the sending computer or simulation model is directly connected.

By implementing the acquisition from the first active equipment item conveying the message, the invention limits the retrieval of the message to a single acquisition, whereas in the known solutions of the prior art, an acquisition is implemented on each of the active equipment items completing the logic paths.

By retrieving only a single copy of the message for all the n simulated recipients instead of n acquisitions of the message on each of the corresponding active equipment items, the simulation unit reduces its processing load.

On the other hand, the simulation unit here retrieves a copy of the messages conveyed on the network, in that way guaranteeing a processing, by the simulated recipient computer, of data actually originating from the network. The result is a simulation more true to reality than in the case of transmission, within the simulation unit, of these messages between two simulation models.

The active equipment items of the network are the active components having the task of transmitting data received at one of their inputs to one or more outputs. In this way, the state of availability of these active equipment items influences the routing of the data to the recipient computers. By way of example, these active equipment items may be switches (or "switch" according to English terminology), but also routers.

Correlatively, the invention relates to a simulation or test method for a network architecture of computers and active equipment items using a simulation unit comprising models simulating at least one part of the said computers, each computer or simulation model communicating on a real network through an active equipment item, known as corresponding active equipment item, to which the said computer, simulated if need be, is directly connected in the network topology, the method comprising the acquisition, by the simulation unit, of a message sent out by a computer or a simulation model on the network, and the transmission of the said acquired message to simulation models that are recipients thereof, in which the said acquisition of the message is carried out at the corresponding active equipment item to which the sending computer or simulation model is directly connected.

This method has the same advantages as the system cited above.

In one embodiment, the simulation unit is equipped to transmit, on the real network, messages sent out by simulation models, at the corresponding active equipment items to which the simulated computers are directly connected. In this way, all the messages circulating among the computers, whether or not the latter are simulated, are transmitted on the real network. In that way, a simulation true to the real configuration modeled, in particular as relates to the real load of the network and the corresponding performance of the computers, is guaranteed.

In one embodiment, the said simulation unit acquires the said message on a surveillance (also known as "monitoring") port of the said corresponding active equipment item. This monitoring port is separate from the input/output ports of the active equipment item for communications on the real network. In that way, the acquisition carried out is not detrimental to the activity on the network and may be carried out easily with parallel connections to the surveillance unit. In addition, since each message may be sent out by only one computer, its acquisition on the monitoring port of the switch/active equipment item to which the said computer is directly connected makes it possible to ensure that the acquisition of the message is the only one.

It was able to be observed, however, that the acquisition of the message at the first switch conceals possible unavailabilities of the network. In order to overcome this disadvantage, it is provided, according to one characteristic of the invention, that the simulation unit monitors the state of the active equipment items of the said real network, and transmits the message to the said recipient simulation models according to the topology of the said network and the state of the active equipment item along a transmission path of the said message. This arrangement is based on the fact that the physical and logic topologies of the network are defined in advance and do not change dynamically. A transmission path in the topology of the network then is defined between a sending computer (simulated or not) and a recipient computer (simulated or not).

In this way it is easy to simulate the non-reception of the message by the simulated computer if the switches/active equipment items that are to route this message are unavailable. This arrangement applies individually for each recipient simulation model.

In particular, the said simulation unit is equipped to acquire at least one state indicator sent out by each of the said active equipment items of the said network, and to generate an indicator of availability of the said transmission path according to the said acquired state indicators. It is understood here that there are as many availability indicators as there are transmission paths provided, that is to say communication routes between a sending computer and a recipient computer.

According to a specific characteristic, the said availability indicator is the result of a logic equation predefined with the aid of a configuration file representative of the topology of the said network architecture. The setting up of these logic equations (step of configuring the simulation unit) thus may be carried out prior to the simulation, and subsequent processing (during the maximal activity of the simulation unit) then is limited to a simple logic/Boolean calculation. In this way the processing for determination of availabilities of the paths by the simulation unit is optimized, for example by limiting the calculation of indicators of availabilities to only the paths used in the aforementioned virtual links VL.

In particular, the logic equations are broken down in and calculated by the said simulation models. In this way, a specific software module of the simulation unit is prevented from centralizing all of these calculations, which is likely to form a bottleneck. As a variant, the availability indicator is calculated by the simulation unit, then transmitted to the recipient models.

In one embodiment, the said simulation unit is equipped to acquire, at the said corresponding active equipment items, all the messages originating from computers or simulation models directly connected thereto. In this way, whatever the replacements of a simulation model with a real computer may be, and vice versa, no redefining or reconfiguration of the simulation unit is necessary.

In one embodiment, the said active equipment items of the network are made redundant and the use of the said message retrieved by a recipient simulation model is dependent on the simultaneous unavailability of an active equipment item and its redundancy.

BRIEF DESCRIPTION OF THE DRAWINGS

Other features and advantages of the invention also will become apparent in the description below, illustrated by the attached drawings, in which.

DESCRIPTION OF THE PREFERRED EMBODIMENTS

Figure 1:
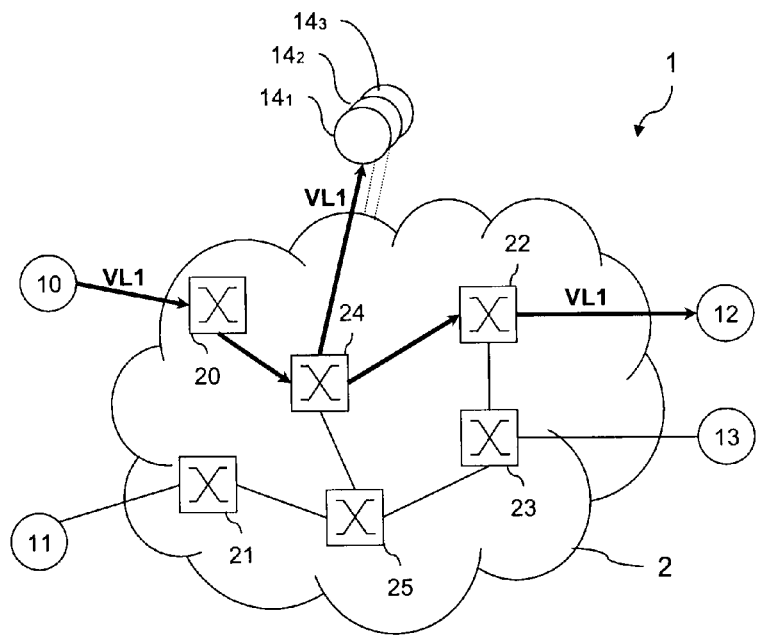
FIG. 1 shows a system on board an aircraft.

On FIG. 1, a communication system 1 installed in an aircraft has been shown. This system 1 is based on an ADCN network the specifications of which are adapted to the air domain, which network is based on the AFDX communication technology the prerequisites for which relating to service quality are designed to ensure a real-time use.

Network 2, which hereinafter is called AFDX network in connection with the associated communication technology, interconnects between them a plurality of on-board equipment items 10, 11, 12, 13, 14, that is to say equipment items performing functions specific to the aircraft. These on-board equipment items also are called computers or LRU ("Line Replaceable Units"). In on-board systems, it is common for the computers to be duplicated for reasons of security. To illustrate that, equipment items $14_2$ and $14_3$ which duplicate computer 14 have been shown on FIG. 1. For the remainder of the description, these redundant computers can be considered as independent computers of system 1.

Network 2 is a digital switching network in which various switches direct the conveyed data from an AFDX bus to another AFDX bus section. These switches here are seen as directive equipment items not changing the content of the conveyed data.

As is seen on the Figure, each computer 10-14 is connected directly to a switch, known as "corresponding switch" (20-24 respectively), which is "its own" point of entry into network 2

Exchanges of data among the various computers 10-14 are carried out in unconnected multicast-("multicast") type mode, that is to say a type 1 transmission to N recipients. This mode of transmission is implemented with the aid of a high-level protocol (above UDP/IP) based on the idea of virtual link ("virtual link" or VL), as cited in document FR 2 868 567: each message sent by a computer 10-14 comprises an identifier, which is used by switches 20-25 of network 2 to route this message (marked $MESS_{MSG}$) to the agreed recipients via the static route defined by this virtual link VL.

It is noted here that the same computer 10-14 may send out information items of different nature, and therefore use several identifiers for each type of information item (that is to say also for each group of intended recipients).

AFDX network 2 initially is preconfigured so that each switch 20-25 receiving a message $MESS_{MSG}$ on a communication port automatically distributes same to a group of statically defined recipient ports. This initial configuration may be carried out with the aid of a configuration file defining the network architecture.

In the example illustrated on FIG. 1 by the heavy-line arrows, computer 10, an altimeter, wishes to transmit an altitude information item to automatic pilot 14 and to a display 12. The transmission of this information item is accomplished on virtual link VL1.

Computer 10 formats the altitude datum in a message $MESS_{MSG1}$ in accordance with the AFDX format, indicating in particular the virtual link MSG1 number, then transmits it on network 2 at its corresponding switch, here switch 10.

The latter, statically configured, identifies the messages and determines on which virtual link VL1 it is to be transmitted and, for example with the aid of a correspondence table, determines the redistribution port or ports, here the port to switch 24. Similarly, the latter, upon receiving a message $MESS_{MSG1}$, retransmits it to two ports: one on which automatic pilot 14 is directly connected, and the other to switch 22. The latter in turn redirects message $MESS_{MSG1}$ to display 12 which is directly connected thereto.

During aircraft development or test phases, one is led to simulate all or part of computers 10-14 of the on-board system. These tests by simulation generally are intended to check the functioning of one or more new equipment items in the network.

Figure 2:
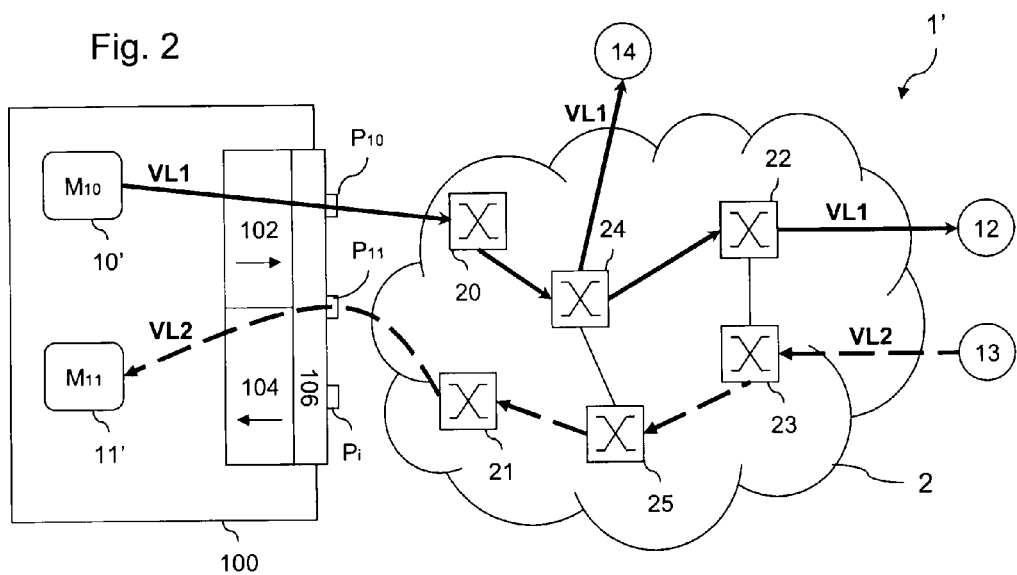
FIG. 2 shows a simulation system based in part on the known one of the prior art.

FIG. 2 illustrates such an on-board network simulation system, as it may result partially from document FR 2 868 567.

The simulated system of FIG. 2 relies on the same AFDX network 2 as that of FIG. 1.

In the configuration shown, three real computers 12, 13 and 14, have been retained, while two computers 10 and 11 henceforth are simulated.

A simulation unit 100, generally implemented on a personal computer or a standard computer server, comprises software subsets 10', 11' simulating the functions of computers 10 and 11 respectively, also called simulation models $M_{10}$, $M_{11}$. These models are run by the simulation unit under the control of a software program for overall management of the simulation.

Unit 100 also comprises functions for communication to AFDX network 2, in particular a software module 102 for formatting and sending out of messages MESS in the AFDX format and a corresponding software module 104 for reception of messages. These communication functions make it possible to send out messages MESS on various input/output interfaces 106 on network 2.

These interfaces are in particular separate physical ports $P_i$, each being connected to a switch 20-25 of network 2. In particular, ports are connected to the corresponding switches of the computers that are simulated. In the example, computers 10 and 11 are simulated, therefore two ports $P_{10} P_{11}$ of unit 100 are connected to switches 20 and 21 corresponding to these two computers.

In this simulation system 1', communications between two real computers 12-14 are implemented in a manner similar to FIG. 1.

On the other hand, an ad hoc management is provided for communications involving a simulated computer 10', 11'.

Going back to our above example illustrating the sending out of a message $MESS_{MSG1}$ by altimeter 10', here simulated, model M10 generates an altitude information item in simulation unit 100. The message comprising this datum, the identification of the sending model and the MSG1 identifier of the virtual link is formulated in AFDX format by module 102 and transmitted on port $P_{10}$ by this same module. The message $MESS_{MSG1}$ then is received by switch 20. The following steps of propagating the message in the network up to real recipient computers 14 and 12 are in accordance with what was described in connection with FIG. 1.

Concerning the transmission of a message $MESS_{MSG2}$ from a real computer, for example computer 13, to a simulated computer, here model $M_{11}$, the propagation of the message is standard according to the static route defined for virtual link VL2, until reaching switch 21. The latter then transmits the message on its port connected to port $P_{11}$, and the simulation unit undertakes acquisition of the message with the aid of module 104 and subsequent transmission thereof to module $M_{11}$.

AFDX switching network 2 is an active network certain components of which may become unavailable according, in particular, to the electrical state of the general system of the aircraft, malfunctions or for simulation needs. In order to validate the compatibility of network 2 with the on-board system under "normal" conditions of use (in particular under real-time constraints), one has been led to turn to this network with the entirety of the messages MESS able to be transmitted on the network, that is to say all the messages between two computers.

It is noted here that the study of the network state conducted during the above simulations is intended to detect any unavailability of the switches, the inter-switch cabling being considered as flawless without any deterioration of the transmitted data (these properties being checked separately).

The invention, however, is compatible with an extension intended to simulate failures in the cabling of the network. In this case, the logic equations cited later will take into account the state of each section of cabling in network 2.

The "normal" recourse to network 2 leads to transmitting all the messages on network 2, including the messages transmitted between two simulated computers.

Figure 3:
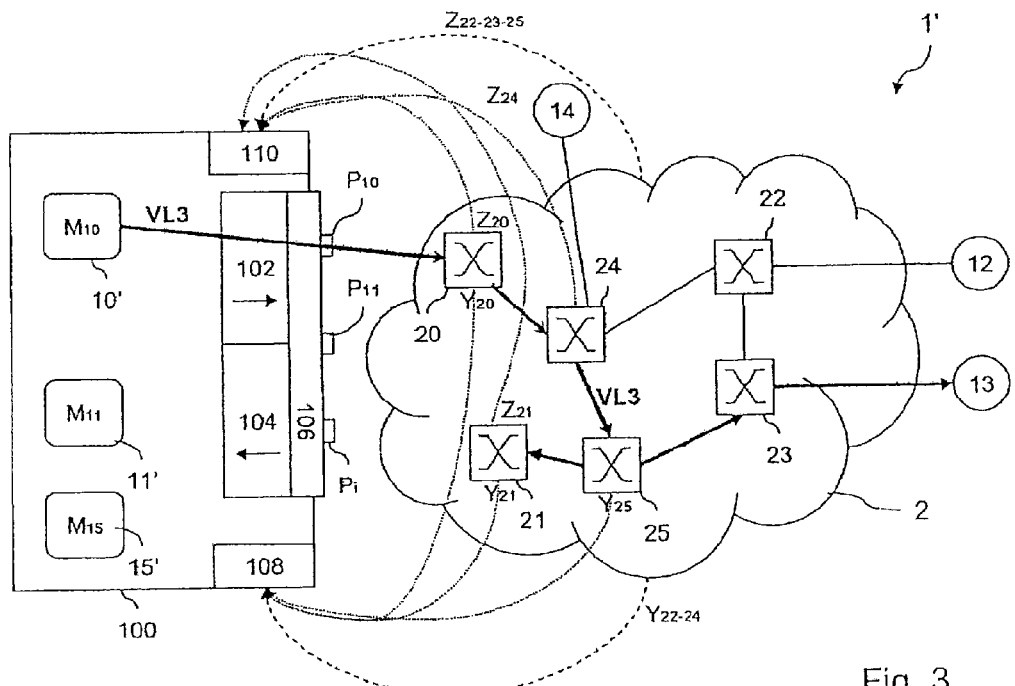
FIG. 3 shows a simulation system according to the invention.

A simulation system according to the invention that makes it possible in particular to lighten the processing load of simulation unit 100 when all the messages are distributed on network 2 has been shown on FIG. 3.

Simulation system 1' comprises the same components as those of the system of FIG. 2. Thus the same reference numbers are retained. The functioning is similar with regard to communications between real computers 12-14 and communications from a simulated computer 10'-11' to a real computer 12-14.

In the example of FIG. 3, simulation unit 100 further comprises a third simulation model $M_{15}$ (simulating a computer 15 provided in the final architecture of the on-board system), a second acquisition software module 108 intended to receive the messages transmitted on surveillance, also called "monitoring," ports $Y_i$, switches 20-25, and a software module 110 equipped to receive an indicator of state of these same switches 20-25, generally on one or more bits.

The switches have one or more "monitoring" ports $Y_{20}$-$Y_{25}$, on which they send out a copy of each message received from a computer equipment item 10-15 directly connected thereto. By virtue of the static definition of the topology of the network, each switch 20-25 is able to identify the source of the messages that it receives and to avoid retransmitting on the monitoring port the messages already having passed in transit through other switches.

"Monitoring" module 108 is connected, with the aid of serial or network computer cables, at least to corresponding switches 20, 21 of simulated computers 10, 11 (ports $P_i$ of interface 106 may be used for this purpose). For more flexibility in the use of the simulation system, in particular because the distribution between real computers and simulation models evolves over time, the set of monitoring ports $Y_{20}$-$Y_{25}$ is connected to module 108.

Similarly, switches 20-25 send out, on a dedicated port $Z_{20}$-$Z_{25}$, a state indicator $E_i$ representative of their state of functioning.

"State" module 110 is connected, with the aid of serial or network computer cables, to all the switches of network 2 (here also, ports $P_i$ of interface 106 may be used). In this way, this module 110 knows the state of switches 20-25 of network 2 at all times.

In the case where failures in the cabling of the network also are being monitored, this module 110 receives information items representative of the state of each cabling section of the network.

When a simulated computer, here for example model $M_{10}$, wishes to send out data to recipients, here 11, 13 and 15, at least one of which also is simulated, here models $M_{11}$ and $M_{15}$, the message $MESS_{MSG3}$ is formulated in AFDX format and transmitted by module 102 on port $P_{10}$ to switch 20. It is noted here that in network 2 the simulated data are injected at the switches directly connected to the computer that is simulated, and not to just any switch (as is the case in the prior art). In this way the most faithful possible reproduction of the normal conditions of use of network 2 by the real system is ensured.

Message $MESS_{MSG3}$ then is transmitted, within network 2, along the various static routes making up virtual link VL3. Network 2 therefore is normally loaded.

According to the invention, since message $MESS_{MSG3}$ received by switch 20 "originated" from a computer 10 (even if it is simulated) that is directly connected thereto, it provides a copy on port $Y_{20}$. "Monitoring" module 108 then acquires message $MESS_{MSG3}$.

At the same time, "state" module 110 acquires a state of all switches 20-25 of network 2. With the aid of logic equations representative of the availability of the static route between two switches, simulation unit 100 generates an indicator of this availability for each route (several routes may be defined between two identical switches, in particular if different virtual links are used). For example, for the route of virtual link VL3 defined between computer 10 and computer 11, the state $E_{10\text{-}11\text{-}VL3}$ of this route is:

$E_{10\text{-}11\text{-}VL3} = E_{20}$ AND $E_{24}$ AND $E_{25}$ AND $E_{21}$ where 'AND' is a Boolean operator and is equivalent to $E_{10\text{-}11\text{-}VL3}=1$ if the route is available.

The logic equations cited above may be constructed in particular during a prior step of configuring simulation unit 100. This construction is accomplished with the aid of the configuration file describing the architecture and the topography of network 2. This configuration may be carried out at the same time as that of switches 20-25 (to statically define the transmission routes of the messages).

Messages $MESS_{MSG3}$ and the corresponding states, here $E_{10\text{-}11\text{-}VL3}$ and $E_{10\text{-}15\text{-}VL3}$ then are transmitted, by simulation unit 100 with the aid of information items of virtual link VL making it possible to identify the recipient computers (and therefore the associated models), to the recipient simulation models, here models $M_{11}$ and $M_{15}$. The states in particular may be made available to the recipient models with the aid of a flag (bit '1' or '0') or a register in a shared memory of simulation unit 100.

Figure 4:
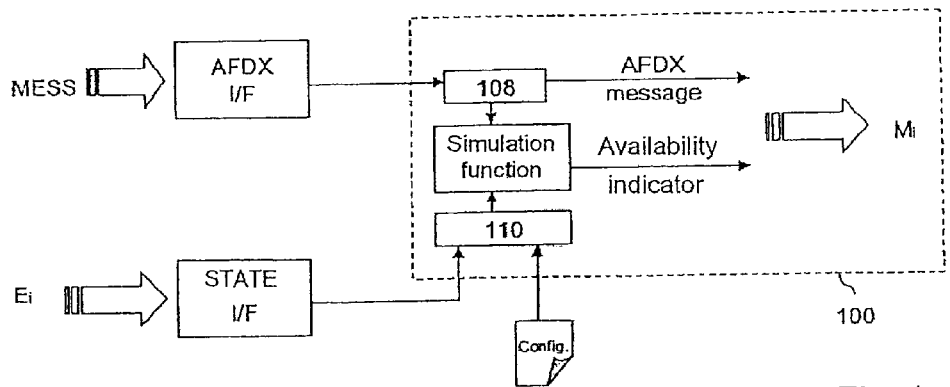
FIG. 4 illustrates the operations for management of the messages and the states of switches in the simulation unit of FIG. 3.

These various operations are illustrated by FIG. 4. Messages MESS and states $E_i$ are acquired by unit 100 through dedicated interfaces. "Monitoring" module 108 receives messages MESS and redirects them to recipient modules $M_i$. At the same time, "status" module 110 initially is configured with the aid of a configuration file describing the network topology, then receives states $E_i$ from the switches of network 2. Availability indicator $E_{i\text{-}j\text{-}VL\alpha}$ deriving from states $E_i$ then is communicated to the same recipient models $M_i$.

The recipient model then takes into account message $MESS_{MSG3}$ only if state E received from the logic path is equivalent to '1' for running thereof. If state E of the logic path is equivalent to '0', which corresponds to an unfeasible transmission route, message $MESS_{MSG3}$ is not taken into account by the recipient model. In that way, it is ensured that running of the simulated computers minimally takes into account the state of the network.

As is seen in this example, simulation unit 100 acquires only a single version of message $MESS_{MSG3}$ whereas in the absence of use of monitoring port Y and states of switches Z, unit 100 would have had to acquire the message twice, once on switch 21 (for model $M_{11}$) and once on switch 25 (for model $M_{15}$).

In this way, by virtue of the invention, the load for processing (in acquisition) by simulation unit 100 is reduced. The saving brought about is all the greater when there are a great number of simulated computers, which is the case, for example, at the beginning of development of a new program.

In one embodiment of the invention, communications from a real computer 12-14 to a simulated computer 10'-11' are handled in a manner similar to the processing of FIG. 2, that is to say according to a standard transmission along various switches of the network.

In a variant applying the teachings of the invention, any message sent out by a real computer 12-14 automatically is acquired, by simulation unit 100, on monitoring port Y of corresponding switch 22-24. The processing cited above for transmitting and ascertaining whether recipient simulation models $M_{11}$ and $M_{15}$ are taking into account messages acquired on the monitoring ports also is implemented.

This invention thus also makes it possible to reduce the load for processing by simulation unit 100 with regard to exchanges between real computers and simulated computers.

Furthermore, irrespective of these variants, in the development cycle it is customary for the number of simulated computers and real computers to evolve. For example, one may disconnect a cable connecting a port of unit 100 to a switch (for example associated with a simulated computer) and connect it between this same switch and the real computer that one no longer wishes to simulate. In one embodiment of the invention favorable in this situation, it is provided that "monitoring" module 108 undertakes continuous acquisition from all monitoring ports Y of the switches having at least one computer directly connected in the permanent architecture of the on-board system. In this way, it is not necessary, when the hardware configuration of simulation system 1' is modified by disconnection and connection of cables as described above, to reconfigure simulation unit 100 and in particular "monitoring" module 108 so that it will take into account, for example, the messages from a new switch.

In a variant of the invention, "state" module 110 records states $E_i$ of the switches in registers specific to each of the switches. As for the type-$E_{10-11-VL3}$ logic equations, they are broken down in the running code of each of models $M_i$ affected. Thus the latter themselves retrieve states $E_i$ in the registers and calculate the indicators of availability of the transmission routes in the network. In this way a concentration of these calculations in a single module of simulation unit 100 is avoided.

Figure 5:
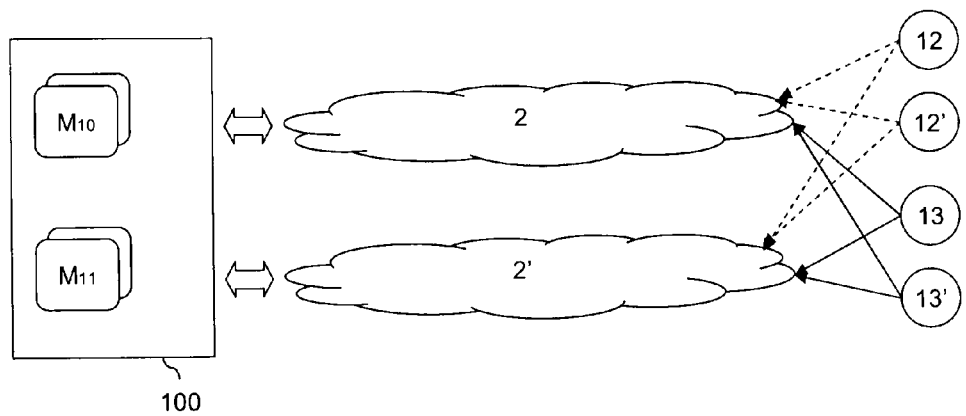
FIGS. 5 and 6 illustrate other embodiments of the invention.

There has been shown on FIG. 5 another embodiment of the invention, in which the ADCN network is made up of two independent AFDX networks 2 and 2' on which computers 10-14 send out data simultaneously.

It then is advisable to take these two networks into consideration in order to determine the availability of the transmission path for the messages, since there are two of them: one via network 2 and the other via network 2'. The logic equations defining this availability then are as follows:

$$E_{availability} = E_{path1} \text{ OR } E_{path2}.$$

Going back to the above example $E_{10-11-VL3}$ and considering that identical static routes are configured on both networks (which is not obligatory), there is obtained (with 20' the switch of network 2' corresponding to switch 20 of network 2):

$$E_{10-11-VL3} = (E_{20} \text{ AND } E_{24} \text{ AND } E_{25} \text{ AND } E_{21}) \text{ OR } (E_{20'} \text{ AND } E_{24'} \text{ AND } E_{25'} \text{ AND } E_{21'}).$$

Figure 6:
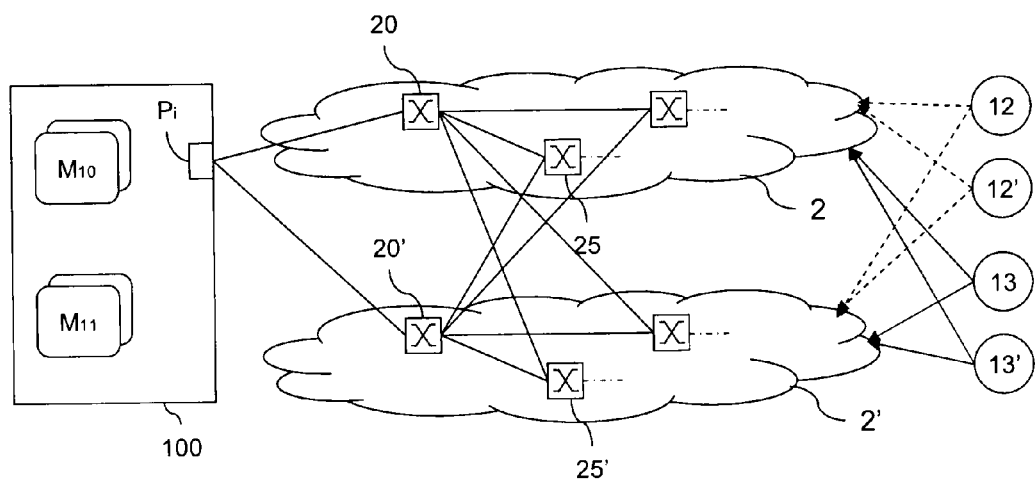

With reference to FIG. 6, there is illustrated another example in which the two networks 2 and 2' are highly interdependent so that each switch is duplicated, independently of the others. This condition is achieved when each switch that is connected to another equipment item/switch also is connected to the redundant switch/equipment item: for example switch 20 is connected to switches 25 and 25', and switch 20' also is connected to switches 25 and 25'.

In this case, the static transmission path for the data may use one or the other of the switches according to the availability thereof. Non-availability of the static route then corresponds to a dual switch failure, that is to say a failure of a switch on network 2 and of its redundancy on network 2'; which in the above example is expressed by:

$$E_{10-11-VL3} = (E_{20} \text{ OR } E_{20'}) \text{ AND } (E_{24} \text{ OR } E_{24'}) \text{ AND } (E_{25} \text{ OR } E_{25'}) \text{ AND } (E_{21} \text{ OR } E_{21'}).$$

As becomes apparent from the foregoing, the invention makes it possible, during simulations:

to have recourse to the communication network with a load equal to an operational functioning, to acquire only once, from the network, the messages deriving from a real computer or from a simulation model and intended for a plurality of simulation models, to reduce, in variable proportion, the processing (acquisition) loads incumbent on the simulation unit, to retain these advantages during modification of distribution of real and simulated computers without having to redefine the simulation unit.

The preceding examples are merely embodiments of the invention, which is not limited thereto.

In particular, although the invention has been described in the aeronautical domain, the simulation system according to the invention may be applied to any type of vehicle having an on-board system, in particular a motor vehicle, a train or a ship.

Furthermore, any communication network, in particular digital and/or switching, is addressed by this invention, and not only the Ethernet networks.

The invention claimed is:

1. A simulation system for a network architecture of real computers and physical switches connected in a real network according to a network topology, the system comprising:
   a real network;
   the computers and the physical switches connected in the real network;
   a simulation unit connected to the real network and comprising simulation models simulating at least part of the computers,
   wherein each real computer and simulation model is configured to communicate on the real network through a corresponding physical switch to which the respective one of the computer and simulation model is directly connected according to the network topology;
   each physical switch includes communication ports to route messages over virtual links in the real network and includes one or more additional surveillance ports configured to send out a copy of each message received by the physical switch on one of its communication ports from a real computer or simulation model that is directly connected to the switch according to the network topology; and
   the simulation unit is configured to acquire a message sent out by a real computer or a simulation model on the real network, from one of the surveillance ports of the corresponding switch to which the computer or simulation model that sent the message is directly connected, and to transmit the message so acquired to one or more simulation models that are recipients of the message.

2. The system according to claim 1, in which the simulation unit is equipped to transmit, on the real network, the message sent out by the simulation model at the corresponding active equipment item to which the simulation model simulating the at least part of the one of the computers is directly connected.

3. The system according to claim 1, in which the simulation unit monitors the state of the equipment items of the real network and transmits the message to the recipient simulation models according to the topology of the network and the state of the active equipment items along a transmission path of the message.

4. The system according to claim 3, in which the simulation unit is equipped to acquire at least one state indicator sent out by each of the active equipment items of the network, and to generate an availability indicator of the transmission path according to the acquired state indicators.

5. The system according to claim 4, in which the availability indicator is the result of a logic equation predefined with the aid of a configuration file representative of the topology of the network architecture.

6. The system according to claim 5, in which the logic equation is broken down and calculated by the simulation models.

7. The system according to claim 1, in which the simulation unit is equipped to acquire, at the corresponding active equipment items, all the messages originating from computers and simulation models directly connected to the corresponding active equipment items.

8. The system according to any one of claims 1, 2, and 3-7, in which the active equipment items of the network are redundant and the use of the retrieved message by a recipient simulation model is dependent on a simultaneous failure of an active equipment item and its redundancy.

9. A simulation method for a network architecture of real computers and physical switches connected in a real network, according to a network topology, the method comprising:
  simulating at least part of the computers in a simulation unit connected to the real network and comprising models;
  communicating, with each real computer and simulation model on the real network through a corresponding physical switch to which the respective one of the computer and simulation model is directly connected according to the network topology;
  routing messages over virtual links in the real network via communication ports in each physical switch;
  sending out a copy of each message received, from a real computer or simulation model that is directly connected to the physical switch according to the network topology, on a communication port of each physical switch via a surveillance port in each corresponding switch,
  acquiring, by the simulation unit, a message sent out by a real computer or a simulation model on the real network, from one of the surveillance ports of the corresponding switch to which the computer or simulation model that sent the message is directly connected; and
  transmitting the acquired message to one or more simulation models that are recipients of the message.

10. A simulation system for a network architecture of real computers and physical switches connected in a real network according to a network topology, the system comprising:
  a real network;
  the computers and the physical switches connected in the real network;
  a simulation unit connected to the real network and comprising simulation models simulating at least part of the computers,
  wherein each real computer and simulation model is configured to communicate on the real network through a corresponding physical switch to which the respective one of the computer and simulation model is directly connected according to the network topology;
  each physical switch includes communication ports to route messages over virtual links in the real network and includes one or more additional surveillance ports configured to send out a copy of each message received by the physical switch on one of its communication ports from a real computer or simulation model that is directly connected to the switch according to the network topology; and
  the simulation unit is configured to acquire a message sent out by a simulation model on the real network, from one of the surveillance ports of the corresponding switch to which the computer or simulation model that sent the message is directly connected, and to transmit the message so acquired to one or more simulation models that are recipients of the message.

11. The system according to claim 1, wherein each physical switch further comprises an additional dedicated port configured to send out a state indicator representative of its state of functioning.

12. The system according to claim 1, wherein a first part of the computers of the network architecture are real computers, and the other computers of the network architecture are computers simulated using simulation models.

13. The method according to claim 9, further comprising:
  transmitting, from the simulation unit on the real network, the message sent out by the simulation model at the corresponding active equipment item to which the simulation model simulating the at least part of the one of the computers is directly connected.

14. The method according to claim 9, further comprising:
  monitoring the state of the equipment items of the real network by the simulation unit; and
  transmitting the message to the recipient simulation models according to the topology of the network and the state of the active equipment items along a transmission path of the message.

15. The method according to claim 14, further comprising:
  acquiring, by the simulation unit, at least one state indicator sent out by each of the active equipment items of the network; and
  generating an availability indicator of the transmission path according to the acquired state indicators.

16. The method according to claim 15, wherein the generating generates the availability indicator based on a result of a logic equation predefined with the aid of a configuration file representative of the topology of the network architecture.

17. The method according to claim 16, further comprising:
  breaking down and calculating the logic equation by the simulation models.

18. The method according to claim 9, further comprising:
  acquiring, by the simulation unit at the corresponding active equipment items, all the messages originating from computers and simulation models directly connected to the corresponding active equipment items.

19. The method according to any one of claims 9 and 13-18, wherein:
  the active equipment items of the network are redundant and the use of the retrieved message by a recipient simulation model is dependent on a simultaneous failure of an active equipment item and its redundancy.

* * * * *